US 6,567,739 B2

(12) United States Patent
Iwamoto et al.

(10) Patent No.: US 6,567,739 B2
(45) Date of Patent: May 20, 2003

(54) CONTROL SYSTEM AND METHOD OF INTERNAL COMBUSTION ENGINE, FOR SUPPRESSING LOAD VARIATION AND IMPROVING SELF-DIAGNOSIS

(75) Inventors: Takashi Iwamoto, Wako (JP); Takashi Isobe, Wako (JP); Manabu Niki, Wako (JP); Hiroyuki Ando, Wako (JP); Kojiro Tsutsumi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 263 days.

(21) Appl. No.: 09/814,763

(22) Filed: Mar. 23, 2001

(65) Prior Publication Data

US 2001/0029424 A1 Oct. 11, 2001

(30) Foreign Application Priority Data

Mar. 24, 2000 (JP) ........................................ 2000-085288

(51) Int. Cl.$^7$ .............................................. F02D 45/00
(52) U.S. Cl. ........................................ 701/114; 123/479
(58) Field of Search ................................. 701/114, 102, 701/115, 110; 180/179; 123/479, 480; 73/117.3

(56) References Cited

U.S. PATENT DOCUMENTS 5,063,901 A * 11/1991 Kaneyasu et al. ........... 123/479
5,349,936 A * 9/1994 Uchinami .................... 73/117.3
6,012,541 A * 1/2000 Nishioka et al. ............. 180/404

FOREIGN PATENT DOCUMENTS

JP          8-151964 A    *  6/1996       ........... F02M/25/08
JP          9-41952           10/1997

* cited by examiner

Primary Examiner—Hieu T. Vo
(74) Attorney, Agent, or Firm—Arent Fox Kintner Plotkin & Kahn, PLLC

(57) ABSTRACT

A control system of an internal combustion engine in a vehicle, for improving the self-diagnosis accuracy and decreasing the frequency of stopping the self-diagnosis process, is disclosed. The system comprises a self-diagnosis section for executing self-diagnosis of the internal combustion engine; a load control section for controlling a load imposed on the internal combustion engine; and a normal driving control section for maintaining a normal driving state in which a variation of the load imposed on the internal combustion engine is suppressed, by operating the load control section while the self-diagnosis is being executed by the self-diagnosis section and while the current driving state of the vehicle is in a predetermined driving range.

17 Claims, 9 Drawing Sheets

CONTROL SYSTEM AND METHOD OF INTERNAL COMBUSTION ENGINE, FOR SUPPRESSING LOAD VARIATION AND IMPROVING SELF-DIAGNOSIS

BACKGROUND OF THE INVENTION

1. Field of the Invention

The present invention relates to a control system and method of an internal combustion engine, and in particular, to one for improving self-diagnosis accuracy.

2. Description of the Related Art

Some internal combustion engines of vehicles or the like have a self-diagnosis system for executing a self-diagnosis process for examining provided components or elements such as catalysts, $O_2$ sensors, evaporating fuel, and the like, so as to detect abnormal states, for example, degradation of relevant components. Generally, the determination of normal or abnormal conditions is performed when predetermined conditions are satisfied.

Japanese Unexamined Patent Application, First Publication, No. Hei 9-41952 discloses an example system of determining the degradation of a catalyst, in which such a self-diagnosis process is performed only when the temperature of the intake air, the temperature of cooling water, and the vehicle speed satisfy the conditions provided for the self-diagnosis. Therefore, the self-diagnosis is not executed when the conditions are not satisfied, for example, when the above-mentioned temperature of the intake air, the temperature of cooling water, and the vehicle speed deviate from corresponding predetermined ranges, or when a sudden load change occurs.

However, in the above conventional self-diagnosis system of internal combustion engines, even if a load change occurs which is not very large, that is, the degree thereof is smaller than a predetermined degree of a "sudden" load change, relevant observed values become unstable and the accuracy is degraded. Here, the predetermined degree of the sudden load change may be a 48 hPA variation in the air intake passage absolute pressure ($\Delta PB$).

If the threshold for the load change, that is, the allowable range for the predetermined condition of the self-diagnosis process is defined very strictly, the above degradation in accuracy can be prevented to a certain degree; however, the self-diagnosis is performed less often, and the frequency of stopping during execution increases.

SUMMARY OF THE INVENTION

In consideration of the above circumstances, an objective of the present invention is to provide a control system and method of an internal combustion engine for improving the self-diagnosis accuracy and decreasing the frequency of stopping the self-diagnosis process.

Therefore, the present invention provides a control system of an internal combustion engine (for example, engine 1 in FIGS. 1 and 9 in the embodiment explained below) in a vehicle, the control system being built into the vehicle, comprising:

a self-diagnosis section for executing self-diagnosis of the internal combustion engine (for example, executing step S1 in FIG. 2 and step S51 in FIG. 10 in the embodiment explained below);

a load control section (for example, motor 21, CVT 22, and VTC 23 in FIGS. 1 and 9, and electric actuator 24 in FIG. 1 in the embodiment explained below) for controlling a load imposed on the internal combustion engine; and a normal driving control section (for example, ECU 5 in FIGS. 1 and 9 in the embodiment explained below) for maintaining a normal driving state in which a variation in the load imposed on the internal combustion engine is suppressed, by operating the load control section while the self-diagnosis is being executed by the self-diagnosis section and while the current driving state of the vehicle is in a predetermined driving range.

Accordingly, when the conditions for executing the self-diagnosis are satisfied, if a load change occurs which is not very large, that is, the degree thereof is smaller than a predetermined degree of the above-explained sudden load change, the normal driving state can be maintained by operating the load control section via the normal driving control section so as to suppress the load variation. Therefore, the self-diagnosis can be more often executed by the self-diagnosis section, and the accuracy of the self-diagnosis can be improved.

It is possible in the above structure that:

the vehicle has a throttle valve and an accelerator;

the load control section includes a throttle valve control section for performing electric drive control of the degree of opening of the throttle (for example, degree of throttle opening $\theta TH$ detected by sensor 4 in FIGS. 1 and 9 in the embodiment explained below) according to the degree of opening of the accelerator (for example, degree of accelerator opening $\theta Acc$ detected by device 26 in FIG. 1 in the embodiment explained below) and the driving state of the vehicle (for example, executing step S3 in FIG. 2 in the embodiment explained below); and the normal driving control section suppresses a variation in the degree of opening of the throttle by operating the throttle valve control section.

In this case, when the conditions for executing the self-diagnosis are satisfied, if a load change in the internal combustion engine occurs, the normal driving control section can suppress a variation in the degree of throttle opening by using the throttle valve control section. Therefore, a variation in the air intake passage absolute pressure (PB) due to a variation in the degree of throttle opening can be suppressed; thus, the self-diagnosis can be more often executed by the self-diagnosis section, and the accuracy of the self-diagnosis can be improved.

It is also possible that:

the load control section includes a motor (for example, motor 21 in FIGS. 1 and 9 in the embodiment explained below) as a driving source of the vehicle and a hybrid control section for performing drive control of the motor according to the driving state of the vehicle (for example, executing step S7 in FIG. 2 and step S56 in FIG. 10 in the embodiment explained below); and the normal driving control section maintains the normal driving state by operating the hybrid control section.

Accordingly, when the conditions for executing the self-diagnosis are satisfied, if a load change in the internal combustion engine occurs, the normal driving control section can suppress a variation in the load of the internal combustion engine by making the hybrid control section drive the motor. Therefore, the self-diagnosis can be more often executed by the self-diagnosis section, and the accuracy of the self-diagnosis can be improved.

The hybrid control section may control the amount of regeneration using the motor. Typically, the hybrid control section controls the amount of regeneration when it is determined that the driver of the vehicle intends to accelerate or decelerate.

The hybrid control section may control the amount of driving assistance using the motor. Typically, the hybrid control section controls the amount of driving assistance when it is determined that the driver of the vehicle intends to accelerate or decelerate.

The present invention also provides a control method of an internal combustion engine in a vehicle, comprising:

a self-diagnosis step of executing self-diagnosis of the internal combustion engine;

a load control step of controlling a load imposed on the internal combustion engine; and a normal driving control step of maintaining a normal driving state in which a variation of the load imposed on the internal combustion engine is suppressed, by executing the load control step while the self-diagnosis is being executed in the self-diagnosis step and while the current driving state of the vehicle is in a predetermined driving range.

It is possible that:

the vehicle has a throttle valve and an accelerator;

the load control step includes a throttle valve control step of performing electric drive control of the degree of opening of the throttle according to the degree of opening of the accelerator and the driving state of the vehicle; and in the load control step, a variation in the degree of opening of the throttle is suppressed by executing the throttle valve control step.

It is also possible that:

the vehicle has a motor as a driving source of the vehicle and the load control step includes a hybrid control step of performing drive control of the motor according to the driving state of the vehicle; and in the normal driving control step, the normal driving state is maintained by executing the hybrid control step.

The hybrid control step may include controlling an amount of regeneration using the motor. Typically, the hybrid control step includes controlling the amount of regeneration when it is determined that the driver of the vehicle intends to accelerate or decelerate.

On the other hand, the hybrid control step may include controlling an amount of driving assistance using the motor. Typically, the hybrid control step includes controlling the amount of driving assistance when it is determined that the driver of the vehicle intends to accelerate or decelerate.

According to the above method, the effects described in the explanation for the control system can also be obtained.

The present invention also provides a computer readable storage medium storing a program for making a computer execute an operation of controlling an internal combustion engine in a vehicle, the operation comprising:

a self-diagnosis step of executing self-diagnosis of the internal combustion engine;

a load control step of controlling a load imposed on the internal combustion engine; and a normal driving control step of maintaining a normal driving state in which a variation of the load imposed on the internal combustion engine is suppressed, by executing the load control step while the self-diagnosis is being executed in the self-diagnosis step and while the current driving state of the vehicle is in a predetermined driving range.

DESCRIPTION OF THE PREFERRED EMBODIMENTS

Hereinafter, the embodiments according to the present invention will be explained in detail with reference to the drawings.

Figure 1:
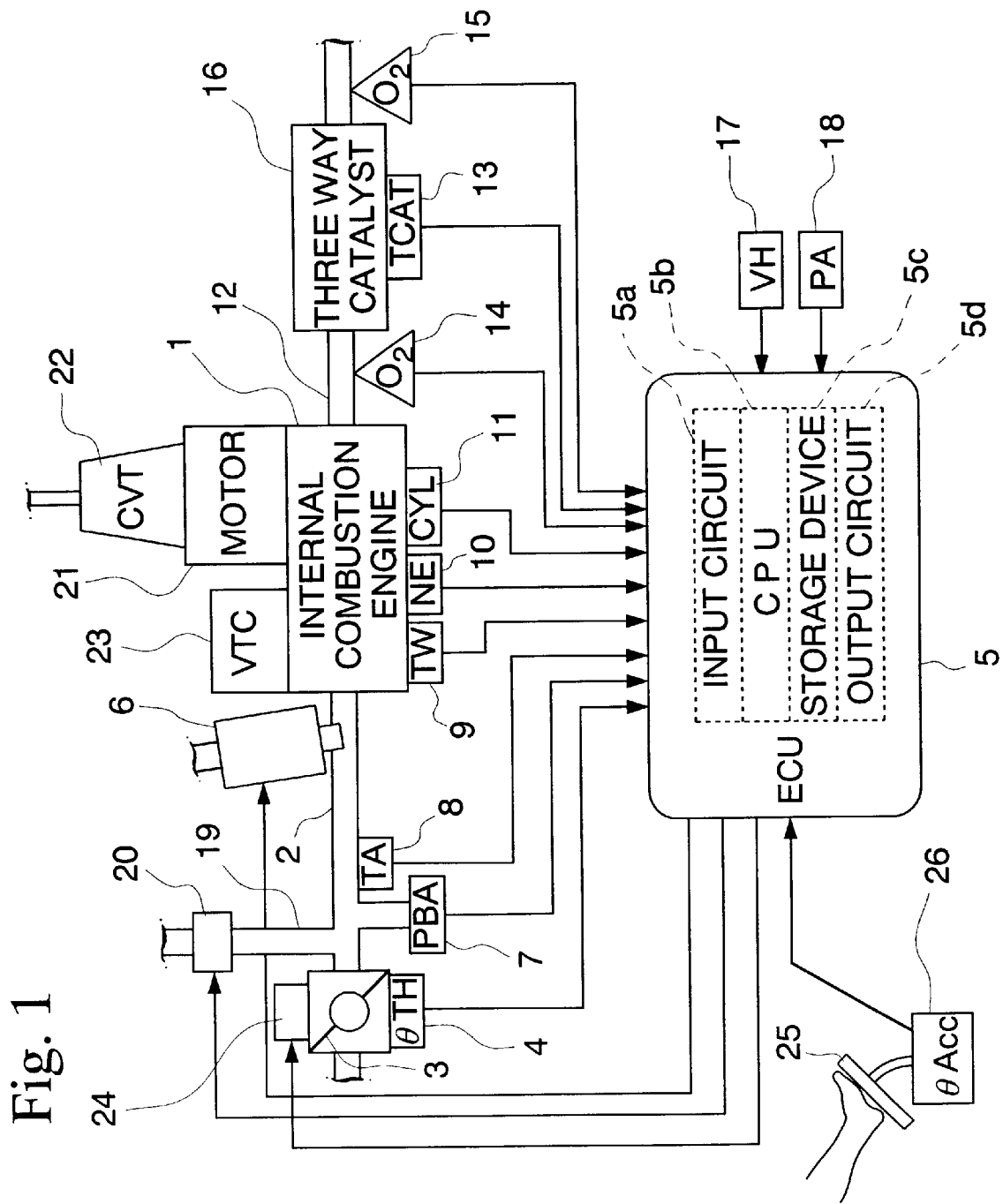
FIG. 1 is a diagram showing the general structure of the first embodiment according to the present invention.

FIG. 1 shows the general structure of a first embodiment of the present invention. In the figure, reference numeral 1 indicates an (internal combustion) engine (e.g., a four cylinder engine), and in the middle of an air intake pipe 2, a throttle valve 3 is attached. A sensor 4 for detecting the degree of throttle opening (θTH) is coupled with the throttle valve 3, and the sensor 4 outputs an electric signal corresponding to the degree of opening of the throttle valve 3 to an electronic control unit 5 for controlling the engine, (abbreviated as "ECU", hereinbelow).

A fuel injection valve 6 is provided for each cylinder, and an air intake valve (not shown) is provided between the engine 1 and throttle valve 3, where the fuel injection valve 6 is positioned at the upstream side of the air intake valve. Each fuel injection valve 6 is connected to a fuel pump (not shown), and is electrically connected to the ECU 5. The opening/closing timing of each fuel injection valve 6 is thus controlled using a control signal output from the ECU 5.

At the downstream side of the throttle valve 3, a PBA sensor 7 for detecting the air intake passage absolute pressure (PBA) is provided in the vicinity of the throttle valve 3. This PBA sensor 7 converts a PBA signal into an electric signal, and the electric signal is then supplied to the ECU 5. At the downstream side of the PBA sensor 7, a TA sensor 8 for detecting the temperature of the intake air (TA) is provided. This TA sensor 8 detects the temperature of the intake air, and outputs a corresponding temperature signal to the ECU 5.

A TW sensor 9 provided at the engine 1 includes, for example, a thermistor, and the TW sensor 9 detects the temperature of the cooling water of the engine 1 (i.e., TW) and outputs a corresponding temperature signal to the ECU 5.

An engine speed (NE) sensor 10 and a cylinder determination (CYL) sensor 11 are provided in the vicinity of a camshaft (not shown) or a crankshaft (not shown) of the engine 1. Each cylinder of the engine 1 is periodically at a TDC (top dead center) position after the air intake process is started, and the NE sensor 10 outputs a TDC pulse signal for a specific crank angle before reaching the crank angle corresponding to the TDC position. If the engine is a four-cylinder type, the NE sensor 10 outputs a TDC pulse signal for each crank angle of 180 degrees. On the other hand, the CYL sensor 11 outputs a CYL pulse signal for a specific crank angle corresponding to the TDC position. Each pulse signal is supplied to the ECU 5.

A three way catalyst 16 (abbreviated as "catalyst", hereinbelow) for purifying the exhaust gas is provided in the middle of an exhaust pipe 12, and an upstream $O_2$ sensor 14 is attached at the upstream side of the catalyst 16, while a downstream $O_2$ sensor 15 is attached at the downstream side of the catalyst 16. Each $O_2$ sensor detects the concentration of oxygen in the exhaust gas, and an electric signal corresponding to the detected value is supplied to the ECU 5.

A TCAT sensor 13 for detecting the temperature of the catalyst (TCAT) is provided at the catalyst 16, and an electric signal corresponding to the detected temperature of the catalyst is supplied to the ECU 5.

In addition, a VH sensor 17 for detecting the vehicle speed (VH) of the present vehicle (in which the engine 1 is mounted), and a PA sensor 48 for detecting the atmospheric pressure (PA) are connected to the ECU 5, so that the detected signals of these connected sensors are supplied to the ECU 5.

A canister (not shown) for absorbing evaporating fuel generated in a fuel tank (via a passage 19) is connected to the air intake pipe 2, and the opening/closing operation of the canister is controlled by ECU 5. A purge control valve 20 provided in the middle of the passage 19 is opened while the engine 1 is operated under specific conditions, so that evaporating fuel stored in the canister is supplied to the air intake pipe 2.

The ECU 5 comprises: an input circuit 5a; a CPU (central processing unit) 5b; a storage device 5c for storing each operation program, the results of each operation, etc.; an output circuit 5b for supplying a driving signal to the fuel injection valve 6; and the like. The ECU 5 shapes the waveform of the input signal from each sensor and corrects the voltage level of the signal to a predetermined level, so as to convert the analog signal value to a digital signal value, by using the above structural elements.

A drive source of the present system is a parallel hybrid type in which a motor 21 is connected to the output shaft of the engine 1. Using this drive source, if the motor 21 is driven during acceleration, the drive force generated by the engine can be assisted, while if deceleration regeneration of the motor 21 is performed during deceleration, the motor can function as a generator and the electric energy generated can be stored in a battery (not shown). In addition, a CVT 22, which is a continuously-variable transmission, is connected to the motor 21.

In the engine 1, a VTC 23, which is a valve opening/closing timing variable mechanism, is provided, by which the opening/closing timing of each air intake valve and exhaust valve can be controlled. Here, the above-mentioned motor 21, CVT 22, and VTC 23 are connected to the ECU 5.

The opening/closing operation of the throttle valve 3 is performed by an electric actuator 24 including a motor, for example. More specifically, the degree of throttle opening is controlled via the electric actuator 24 by using a control signal from the ECU 5, which is output according to a signal from a device for detecting the degree of opening of an accelerator pedal 25 (i.e., degree of accelerator opening ($\theta$Acc) corresponding to the degree of depression of the accelerator pedal) and to the driving state of the vehicle.

Figure 2:
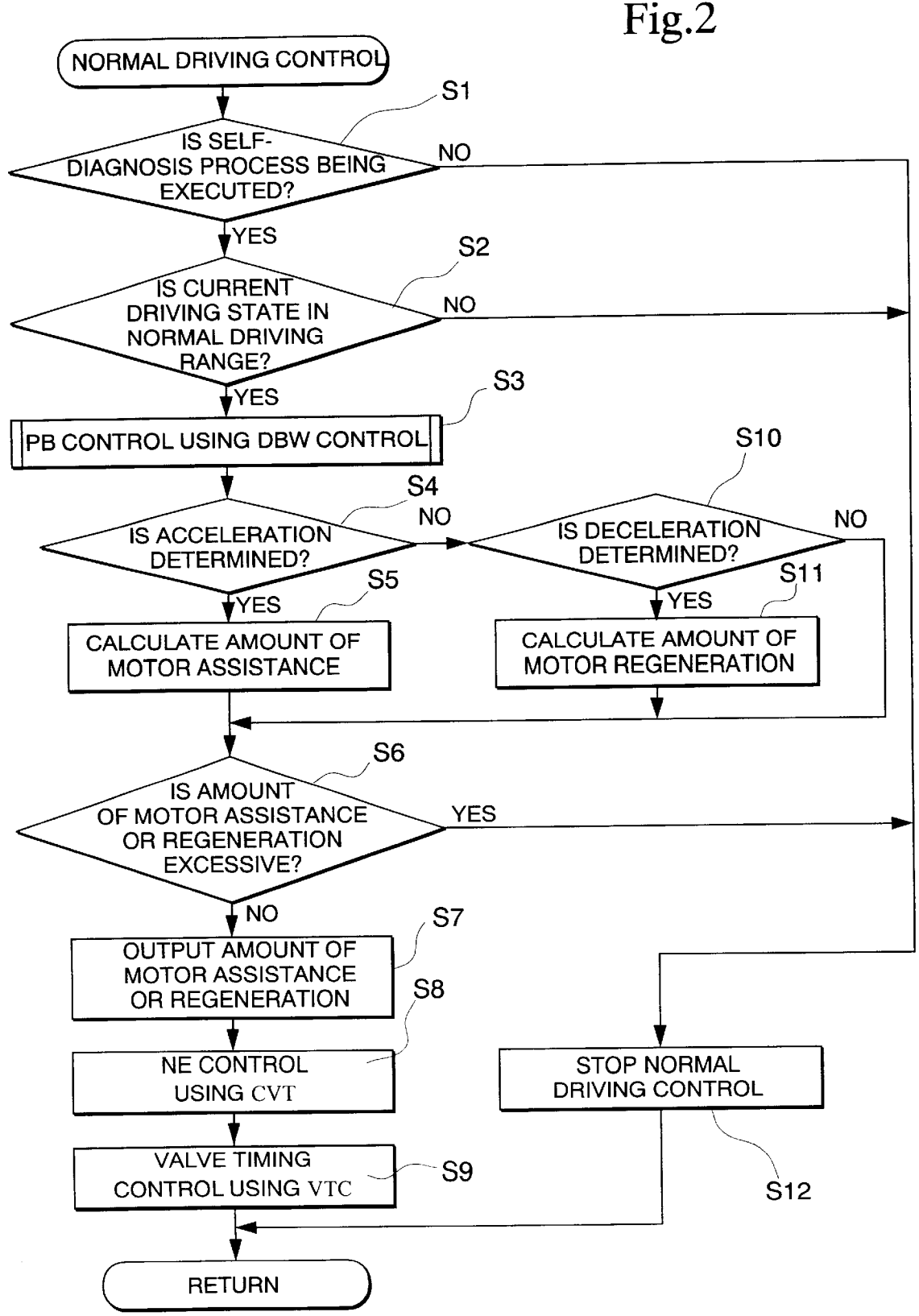
FIG. 2 is a flowchart of the normal driving control operation of the first embodiment.

Below, with reference to the flowchart shown in FIG. 2, the normal driving control operation using the ECU 5 will be explained. Here, the operation is executed at regular intervals of a predetermined time, for example, every 50 msec.

In step S1, it is determined whether the self-diagnosis process (also performed by the ECU 5) for determining whether the engine 1 is in an abnormal state is being executed. If a sudden load change occurs which is larger than a predetermined amount (for example, a 48 hPA variation in the air intake passage absolute pressure $\Delta$PB), then the self-diagnosis process is stopped. Therefore, if it is determined in step S1 that the self-diagnosis process is not being executed, then the operation shifts to step S12 because a sudden load change (which does not satisfy the conditions for executing the self-diagnosis process) has occurred and the following processes are unnecessary, and the normal driving control of FIG. 2 is completed.

Figure 3:
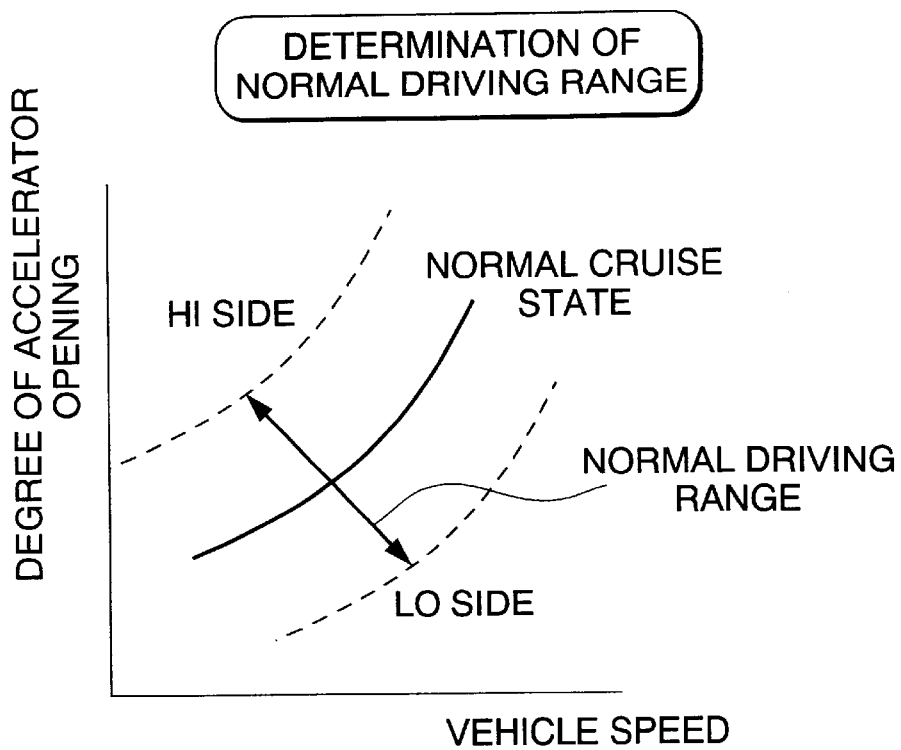
FIG. 3 is a graph showing the normal driving range defined in the first embodiment.

If it is determined in step 1 that the self-diagnosis process is being executed, then in the next step S2, it is determined whether the current driving state is in a predetermined normal driving range. This determination is performed by referring to a normal driving range determination chart (see FIG. 3) defined using the degree of accelerator opening and the vehicle speed. As shown in FIG. 3, a normal driving range, in which a solid line indicating the normal cruise state is defined, is positioned between the HI (i.e., high) side and the LO (i.e., low) side, where each side has a fixed area. This normal driving range corresponds to the predetermined driving range according to the present invention. In addition, in the above normal cruise state, basically, neither the assistance nor the regeneration process using the motor 21 is performed; however, power generation using the motor 21 may be performed if necessary.

If it is determined in step S2 that the current driving state is in a normal driving range, then the operation proceeds to step S3, where PB control of the air intake passage absolute pressure by using DBW (drive by wire) control is executed.

This PB control using DBW control operates the throttle valve 3 by using the electric actuator 24, depending on the accelerator operation by a driver or on the driving state, as explained above. The details of the PB control will be explained below.

Figure 4:
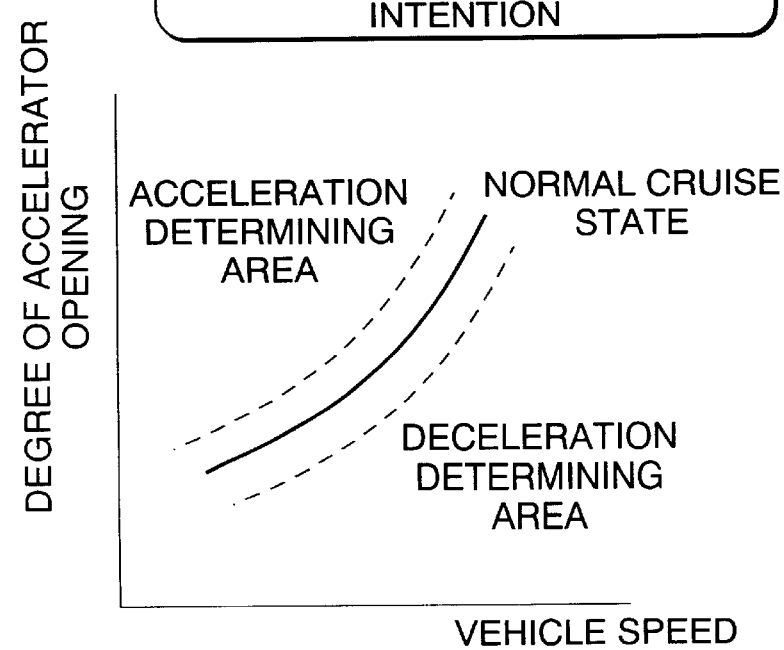
FIG. 4 is a graph showing the acceleration and deceleration determining areas defined in the first embodiment.

After the PB control process using DBW control in step S3 is completed, in the following step S4, it is determined whether the driver intends to accelerate. This determination is performed based on an acceleration/deceleration intension determination chart defined by the degree of accelerator opening and the vehicle speed, as shown in FIG. 4. In the figure, a range, narrower than the above-explained normal driving range, in which a solid line indicating the normal cruise state is defined, is positioned between a higher side and a lower side, where the higher side is defined as an acceleration determining area, while the lower side is defined as a deceleration determining area. Given a fixed vehicle speed, if the degree of accelerator opening is in the acceleration determining area in FIG. 4, then it is determined that the driver intends to accelerate (i.e., acceleration is determined), while if the degree of accelerator opening is in the deceleration determining area in FIG. 4, then it is determined that the driver intends to decelerate (i.e., deceleration is determined).

If acceleration is determined in step S4, the operation proceeds to step S5, where the amount of motor assistance is calculated. The operation then proceeds to step S6.

If acceleration is not determined in step S4, the operation proceeds to step S10, where it is determined whether deceleration is determined. If deceleration is determined in step S10 (i.e., the current driving state is in the deceleration determining area in FIG. 4), then in the next step S11, the amount of motor regeneration is calculated.

Figure 5:
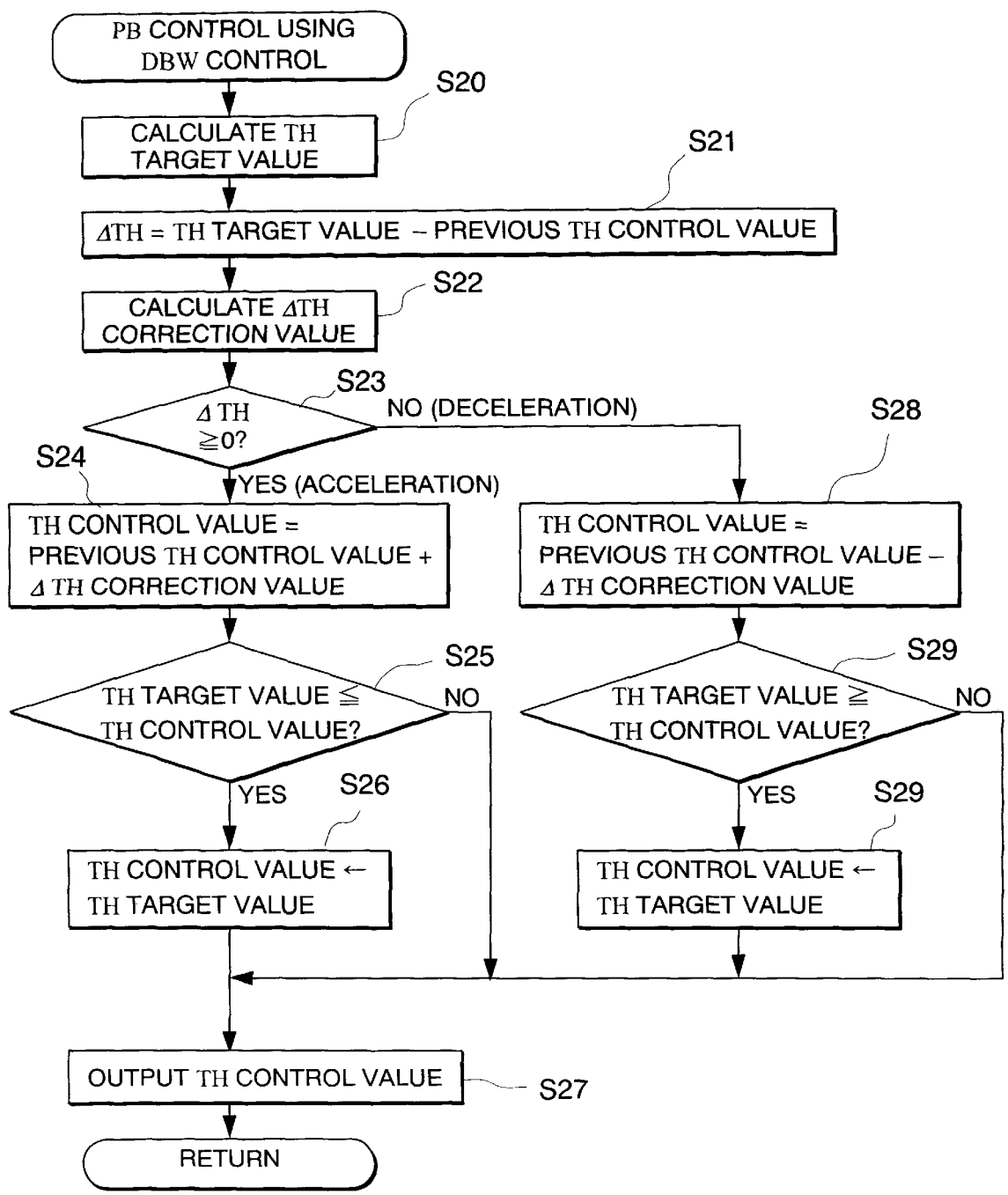
FIG. 5 is a flowchart of DBW control in the first embodiment.

Here, the amount of motor assistance in step S5 or the amount of motor regeneration in step S11 is calculated according to a load variation, for example, a difference between a TH target value and a TH control value (as shown in FIG. 5) as explained below. In this case, the larger the difference, the larger the calculated amount of motor assistance or regeneration becomes.

If deceleration is not determined in step S10, then it is determined that a corrective operation using the motor 21 is unnecessary, and the operation proceeds to step S6.

In step S6, it is determined whether the calculated amount of motor assistance or regeneration is excessive. If the determination is "YES", that is, if the calculated amount of motor assistance or regeneration exceeds a correctable amount using the motor, then the operation proceeds to step S12, thereby stopping the operation of the normal driving control.

If it is determined in step S6 that the amount of motor assistance or regeneration is not excessive, then the operation proceeds to step S7, where the calculated amount (i.e., value or data) of motor assistance or regeneration is output (or designated) to the motor 21 so as to perform torque control using the motor. That is, if acceleration is determined in step S4, the output of the engine 1 is assisted by using the motor 21 according to the amount of motor assistance calculated in step S5, while if deceleration is determined in step S10, regeneration using the motor 21 is performed based on the amount of motor regeneration calculated in step S11.

In step S8, the gear ratio of the CVT 22 is set or changed so as to control the engine speed NE, and in the following step S9, the opening/closing timing of the relevant valves are controlled using the VTC 23. More specifically, variations in combustion in the combustion chamber are suppressed by fixing the opening/closing timing of the valves. The process in the flowchart in FIG. 2 is then completed.

Below, the PB control using DBW control in the above step S3 will be explained with reference to the flowchart in FIG. 5.

Figure 6:
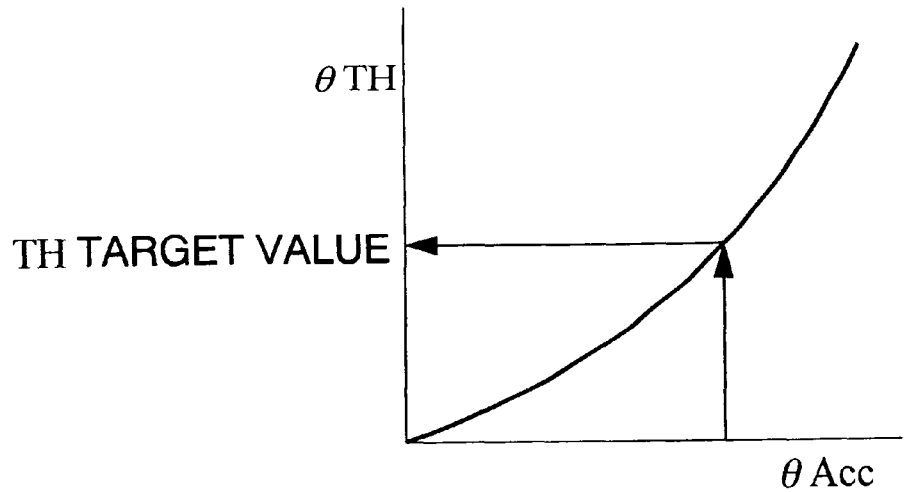
FIG. 6 is a graph showing target values of the degree of throttle opening, depending on the degree of accelerator opening.

First, in step S20, the TH target value is calculated. This TH target value is determined by referring to a chart as shown in FIG. 6, in which the degree of throttle opening θTH is determined corresponding to the degree of accelerator opening θAcc.

In the next step S21, the difference ΔTH between the calculated TH target value and the previous TH control value is calculated, where the previous TH control value is the degree of throttle opening which was determined in the last or preceding execution of the relevant operation.

Figure 7:
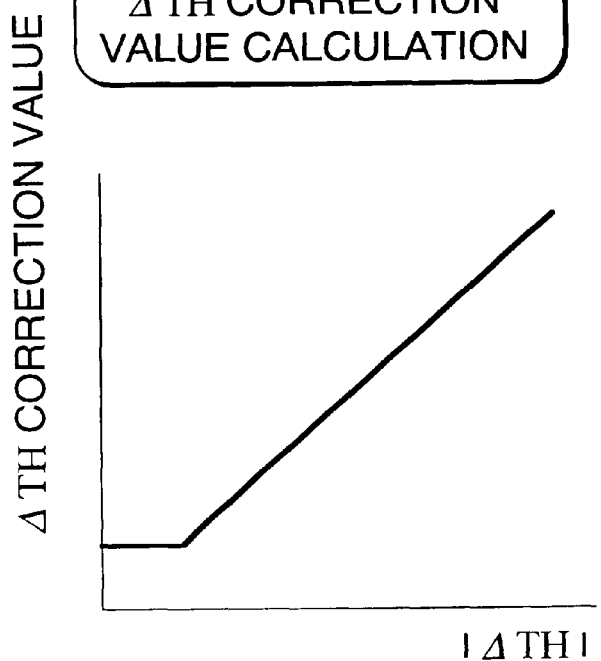
FIG. 7 is a graph showing the ΔTH correction value calculation chart.

In the following step S22, a ΔTH correction value is calculated. This ΔTH correction value is determined by referring to a ΔTH correction value calculation chart as shown in FIG. 7, which determines ΔTH correction values for each absolute value of the above-mentioned ΔTH. According to the ΔTH correction value, the above TH control value, that is, the degree of throttle opening, can be moderately and suitably changed with respect to the TH target value.

In the next step S23, it is determined whether the calculated ΔTH is equal to or above 0. If "YES", that is, if acceleration is determined, then the operation proceeds to step S24, where the TH control value is set to a value obtained by adding the ΔTH correction value to the previous TH control value. This TH control value is a calculated value which is used for actually controlling the degree of throttle opening.

If it is determined in step S23 that ΔTH is less than 0, that is, if deceleration is determined, then the operation proceeds to step S28, where the TH control value is set to a value obtained by subtracting the ΔTH correction value from the previous TH control value.

In the next step S25, the TH target value and the TH control value are compared. If the TH control value is smaller than the TH target value, then the operation proceeds to step S27, where the above-calculated TH control value is output to the electric actuator 24 as an actual control value for controlling the degree of throttle opening. The process in the flowchart in FIG. 5 is then completed.

If it is determined in step S25 that the TH control value is equal to or above the TH target value, then in the next step S26, the TH control value is set to the TH target value (i.e., the TH control value is updated). The operation then proceeds to the step S27.

On the other hand, in step S29, the TH target value and the TH control value are compared. If it is determined that the above-mentioned TH target value is equal to or above the TH control value, then in the following step S30, the TH control value is set to the above TH target value, and the operation proceeds to step S27, where the above-explained process is executed. The process in the flowchart in FIG. 5 is then completed.

If it is determined in step S29 that the above TH target value is smaller than the TH control value, then the operation proceeds to step S27 in which the above-explained process is performed, and the process in the flowchart in FIG. 5 is completed. That is, in steps S26 and S30, control for limiting the TH control value by using the TH target value as a limit value is performed.

Figure 8:
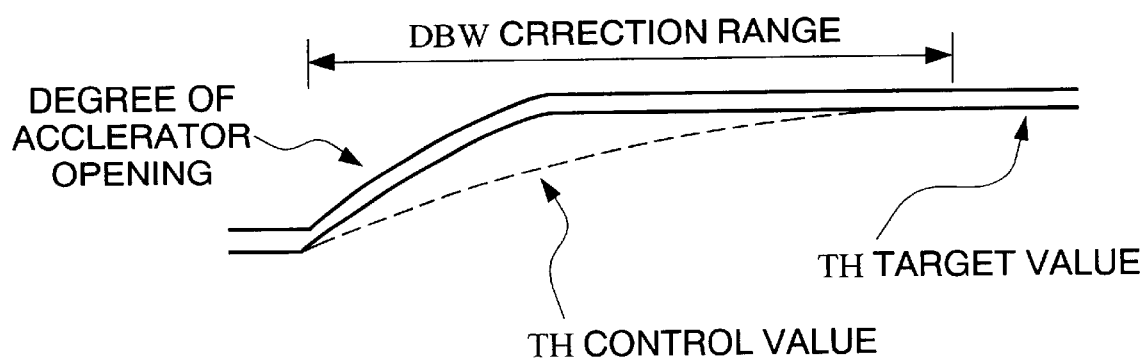
FIG. 8 is a graph showing the degree of throttle opening corrected by using DBW control.

According to the control based on the flowchart in FIG. 5, in the target range for the correction using DBW control, the controlled degree of throttle opening (i.e., TH control value) can follow the change in the TH target value accurately and smoothly, as shown in FIG. 8.

According to the above-explained first embodiment, when the self-diagnosis process is being executed and the current driving state is in a normal driving range, (i) moderate PB control using DBW control is performed, (ii) the engine operation during acceleration or deceleration is corrected using drive assistance or regeneration by the motor, (iii) the engine speed NE is controlled using the CVT 22, and (iv) variations in combustion in the combustion chamber are suppressed by the VTC 23, thereby maintaining a normal driving state in which load variations in the internal combustion engine are suppressed. As a result, the self-diagnosis process can be performed more often, and thus the self-diagnosis accuracy can be improved.

Figure 9:
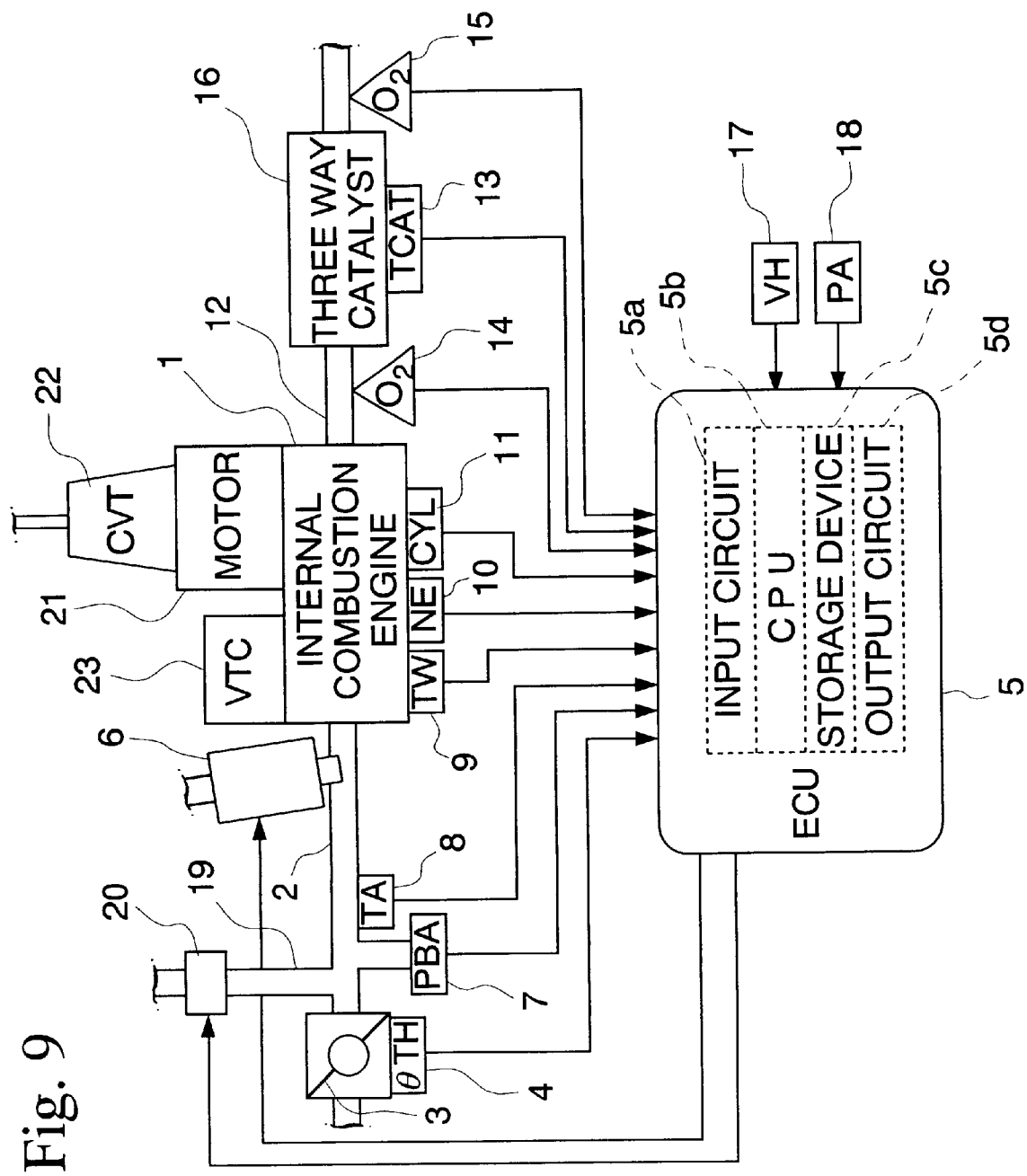
FIG. 9 is a diagram showing the general structure of the second embodiment according to the present invention.

FIG. 9 shows the general structure of the control system of the second embodiment according to the present invention. This structure in this figure is almost the same as that of the above-explained first embodiment. The difference is that the structure of FIG. 9 does not have the device 26 for detecting the degree of opening of the accelerator 25 (θAcc) and the electric actuator 24 used in the first embodiment. In FIG. 9, parts identical to those in FIG. 1 are given identical reference numbers, and explanations thereof are omitted here.

Figure 10:
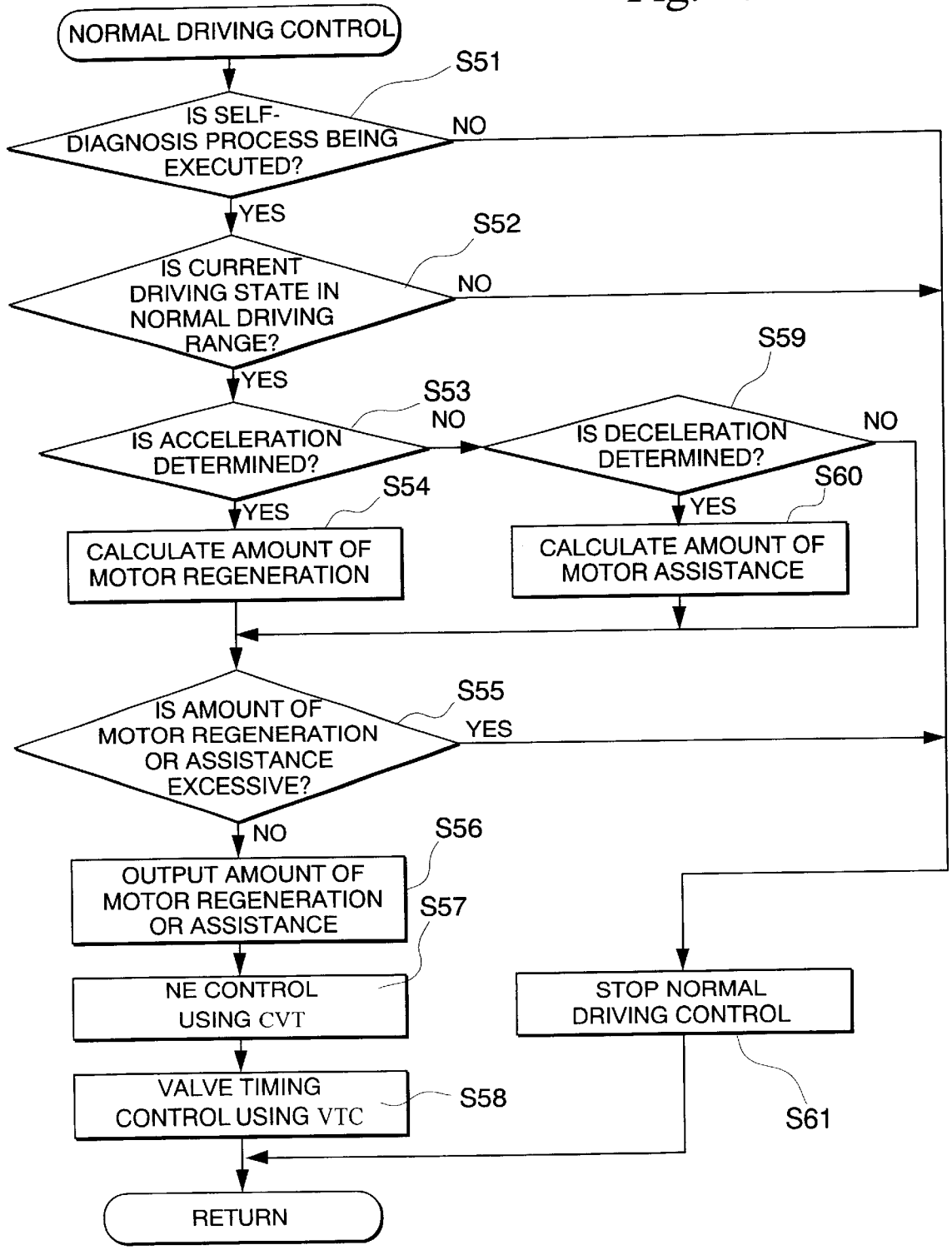
FIG. 10 is a flowchart of the normal driving control operation of the second embodiment.

The normal driving control of the preset embodiment will be explained using the flowchart shown in FIG. 10. Here, the operation is executed at regular intervals of a predetermined time, for example, every 50 msec.

In step S51, it is determined whether the self-diagnosis process is being executed. If it is determined that the self-diagnosis process is not being executed, a sudden load change larger than a predetermined amount has occurred (that is, conditions for executing the self-diagnosis process are not satisfied). Therefore, the operation shifts to step S61 because the following processes are unnecessary, and the operation of the normal driving control is stopped.

Figure 11:
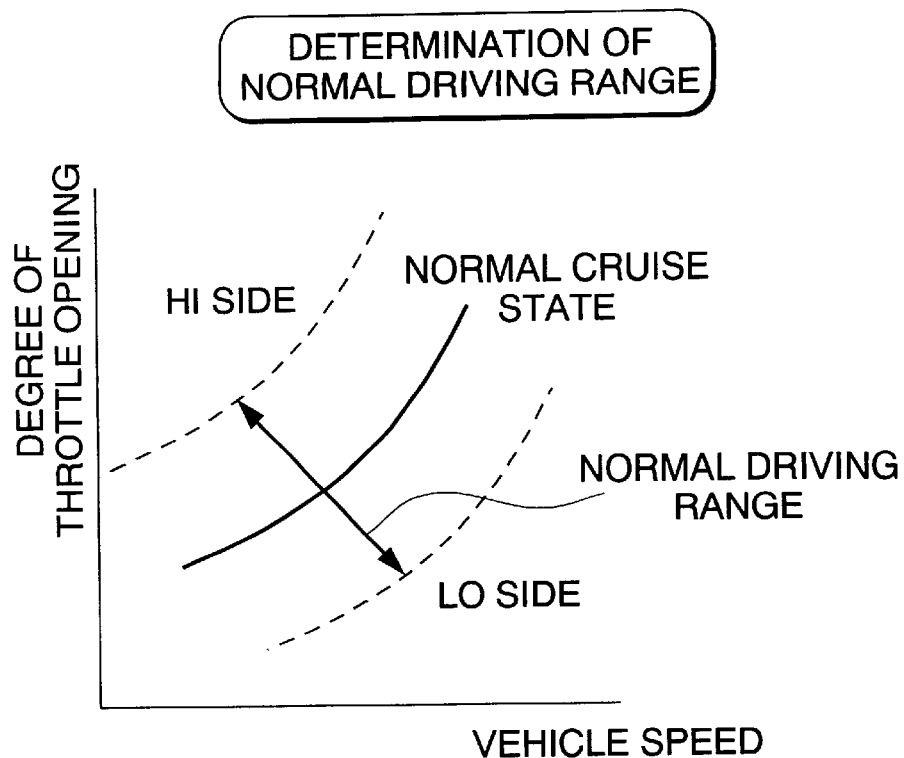
FIG. 11 is a graph showing the normal driving range defined in the second embodiment.

If it is determined in step 51 that the self-diagnosis process is being executed, then in the next step S52, it is determined whether the current driving state is in a normal driving range. This determination is performed by referring to a normal driving range determination chart defined using the degree of throttle opening and the vehicle speed. As shown in FIG. 11, a normal driving range, in which a solid line indicating the normal cruise state is defined, is positioned between the HI (i.e., high) side and the LO (i.e., low) side, where each side has a fixed area.

Figure 12:
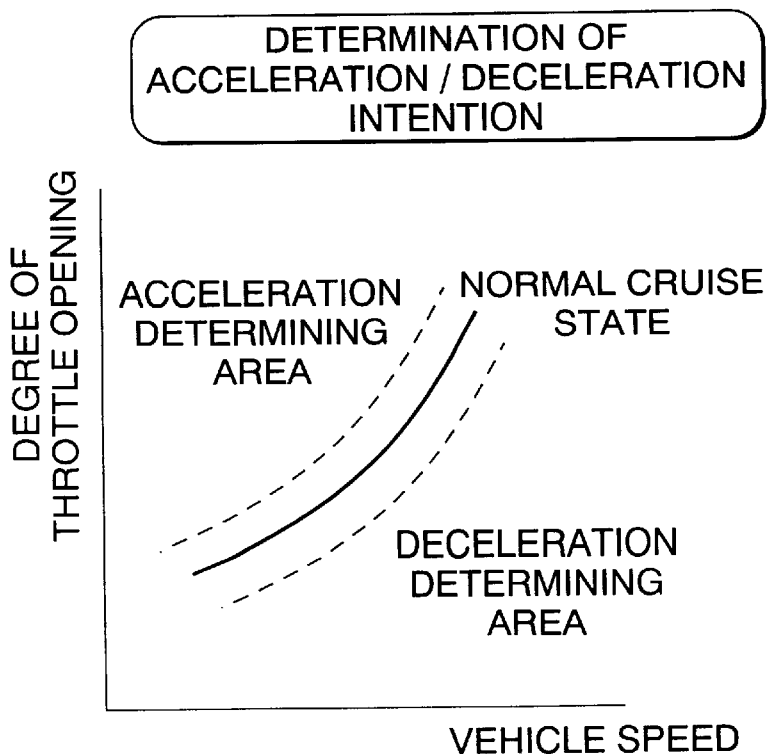
FIG. 12 is a graph showing the acceleration and deceleration determining areas defined in the second embodiment.

If it is determined in step S52 that the current driving state is in a normal driving range, then the operation proceeds to step S53, where it is determined whether the driver intends to accelerate or decelerate. This determination is performed based on an acceleration/deceleration intension determination chart defined by the degree of throttle opening and the vehicle speed, as shown in FIG. 12. The explanations about the acceleration range and the deceleration range are similar to those for the above FIG. 4. That is, given a fixed vehicle speed, if the degree of throttle opening is in the acceleration determining area in FIG. 12, then it is determined that the driver intends to accelerate (i.e., acceleration is determined), while if the degree of throttle opening is in the deceleration determining area in FIG. 12, then it is determined that the driver intends to decelerate (i.e., deceleration is determined).

If acceleration is determined in step S53, then the operation proceeds to step S54, where the amount of motor regeneration is calculated. The operation then proceeds to step S55.

If acceleration is not determined in step S53, then the operation proceeds to step S59, where it is determined whether deceleration is determined. If deceleration is determined in step S59, that is, if the current driving state is in the deceleration determining area in FIG. 12, then in the next step S60, the amount of motor assistance is calculated.

Here, the amount of motor regeneration in step S54 or the amount of motor assistance in step S60 is calculated according to a variation in the load, for example, at least a variation in the degree of throttle opening. In this case, the larger the variation, the larger the calculated amount of motor regeneration or assistance becomes.

If deceleration is not determined in step S59, then it is determined that a corrective operation using the motor 21 is unnecessary, and the operation proceeds to step S55.

In step S55, it is determined whether the calculated amount of motor regeneration or assistance is excessive. If the determination is "YES", that is, if the calculated amount of motor regeneration or assistance exceeds a correctable amount using the motor, then the operation proceeds to step S61, thereby stopping the operation of the normal driving control.

If it is determined in step S55 that the amount of motor regeneration or assistance is not excessive, then the operation proceeds to step S56, where the calculated amount (i.e., value or data) of motor regeneration or assistance is output (or designated) to the motor 21 so as to perform torque control using the motor. That is, if acceleration is determined in step S53, regeneration using the motor 21 is performed based on the amount of motor regeneration calculated in step S54, while if deceleration is determined in step S59, then the output of the engine 1 is assisted by using the motor 21 according to the amount of motor assistance calculated in step S60.

As explained above, in the present embodiment, the degree of throttle opening is directly determined according to the operation of the accelerator pedal by the driver. Therefore, when the degree of throttle opening enters the acceleration range, the regenerative operation of the motor 21 is performed in order to suppress an increase in the engine speed NE. That is, suppression of the engine speed NE is given priority, and accordingly, a sudden increase in the engine speed NE can be suppressed and the self-diagnosis accuracy can be improved. In addition, in the opposite situation, the driving power of the engine 1 is assisted by the motor 21, so as to increase the engine speed NE.

In step S57, the gear ratio of the CVT 22 is set or changed so as to control the engine speed NE, and in the following step S58, the opening/closing timing of the relevant valves are controlled using VTC 23. More specifically, variations in combustion in the combustion chamber are suppressed by fixing the opening/closing timing of the valves. The process in FIG. 10 is then completed.

According to the above-explained second embodiment, when the self-diagnosis process is being executed and the current driving state is in a normal driving range, (i) variations in the engine speed NE during acceleration or deceleration can be suppressed by using the driving assistance or regeneration of the motor 21 as much as possible, (ii) the engine speed NE can be further suppressed using the CVT 22, and (iii) variations in combustion in the combustion chamber are suppressed by the VTC 23, thereby maintaining a normal driving state in which load variations in the internal combustion engine are suppressed. As a result, the self-diagnosis process can be performed more often, and thus the self-diagnosis accuracy can be improved.

The present invention is not limited to the above-explained embodiments. For example, normal driving control using only the PB control employing DBW is possible. Similarly, it is possible to perform normal driving control using only CVT 22 or VTC 23, or together with another load control device.

In addition, a program for making a computer execute the above explained operation (of the control system) may be stored in a storage medium such as a floppy disk, hard disk, or the like. Typically, the computer includes the ECU 5 in FIGS. 1 and 9, and the CPU 5b may execute the program.

What is claimed is:

1. A control system of an internal combustion engine in a vehicle, the control system being built into the vehicle, comprising:
   a self-diagnosis section for executing self-diagnosis of the internal combustion engine;
   a load control section for controlling a load imposed on the internal combustion engine; and
   a normal driving control section for maintaining a normal driving state in which a variation of the load imposed on the internal combustion engine is suppressed, by operating the load control section while the self-diagnosis is being executed by the self-diagnosis section and while the current driving state of the vehicle is in a predetermined driving range.

2. A control system as claimed in claim 1, wherein:
the vehicle has a throttle valve and an accelerator;
the load control section includes a throttle valve control section for performing electric drive control of the degree of opening of the throttle according to the degree of opening of the accelerator and the driving state of the vehicle; and
the normal driving control section suppresses a variation in the degree of opening of the throttle by operating the throttle valve control section.

3. A control system as claimed in claim 1, wherein:
the load control section includes a motor as a driving source of the vehicle and a hybrid control section for performing drive control of the motor according to the driving state of the vehicle; and
the normal driving control section maintains the normal driving state by operating the hybrid control section.

4. A control system as claimed in claim 3, wherein the hybrid control section controls an amount of regeneration using the motor.

5. A control system as claimed in claim 4, wherein the hybrid control section controls the amount of regeneration when it is determined that the driver of the vehicle intends to accelerate or decelerate.

6. A control system as claimed in claim 3, wherein the hybrid control section controls an amount of driving assistance using the motor.

7. A control system as claimed in claim 6, wherein the hybrid control section controls the amount of driving assistance when it is determined that the driver of the vehicle intends to accelerate or decelerate.

8. A computer readable storage medium storing a program for making a computer execute an operation of controlling an internal combustion engine in a vehicle, the operation comprising:
a self-diagnosis step of executing self-diagnosis of the internal combustion engine;
a load control step of controlling a load imposed on the internal combustion engine; and
a normal driving control step of maintaining a normal driving state in which a variation of the load imposed on the internal combustion engine is suppressed, by executing the load control step while the self-diagnosis is being executed in the self-diagnosis step and while the current driving state of the vehicle is in a predetermined driving range.

9. A computer readable storage medium as claimed in claim 8, wherein:
the vehicle has a throttle valve and an accelerator;
in the operation, the load control step includes a throttle valve control step of performing electric drive control of the degree of opening of the throttle according to the degree of opening of the accelerator and the driving state of the vehicle; and
in the load control step, a variation in the degree of opening of the throttle is suppressed by executing the throttle valve control step.

10. A computer readable storage medium as claimed in claim 8, wherein:
the vehicle has a motor as a driving source of the vehicle, and in the operation, the load control step includes a hybrid control step of performing drive control of the motor according to the driving state of the vehicle; and
in the normal driving control step, the normal driving state is maintained by executing the hybrid control step.

11. A control method of an internal combustion engine in a vehicle, comprising:
a self-diagnosis step of executing self-diagnosis of the internal combustion engine;
a load control step of controlling a load imposed on the internal combustion engine; and
a normal driving control step of maintaining a normal driving state in which a variation of the load imposed on the internal combustion engine is suppressed, by executing the load control step while the self-diagnosis is being executed in the self-diagnosis step and while the current driving state of the vehicle is in a predetermined driving range.

12. A control method as claimed in claim 11, wherein:
the vehicle has a throttle valve and an accelerator;
the load control step includes a throttle valve control step of performing electric drive control of the degree of opening of the throttle according to the degree of opening of the accelerator and the driving state of the vehicle; and
in the load control step, a variation in the degree of opening of the throttle is suppressed by executing the throttle valve control step.

13. A control method as claimed in claim 11, wherein:
the vehicle has a motor as a driving source of the vehicle and the load control step includes a hybrid control step of performing drive control of the motor according to the driving state of the vehicle; and
in the normal driving control step, the normal driving state is maintained by executing the hybrid control step.

14. A control method as claimed in claim 13, wherein the hybrid control step includes controlling an amount of regeneration using the motor.

15. A control method as claimed in claim 14, wherein the hybrid control step includes controlling the amount of regeneration when it is determined that the driver of the vehicle intends to accelerate or decelerate.

16. A control method as claimed in claim 13, wherein the hybrid control step includes controlling an amount of driving assistance using the motor.

17. A control method as claimed in claim 16, wherein the hybrid control step includes controlling the amount of driving assistance when it is determined that the driver of the vehicle intends to accelerate or decelerate.

* * * * *